C. B. SCHOENMEHL.
PRIMARY BATTERY.
APPLICATION FILED DEC. 9, 1910.

1,080,483.

Patented Dec. 2, 1913.

Witnesses
Ruth M. Worden
Helen F. McGrath

Inventor
Charles B. Schoenmehl
By Christian M. Newman
for Chamberlain & Newman Attorneys

UNITED STATES PATENT OFFICE.

CHARLES B. SCHOENMEHL, OF WATERBURY, CONNECTICUT.

PRIMARY BATTERY.

1,080,483. Specification of Letters Patent. Patented Dec. 2, 1913.

Application filed December 9, 1910. Serial No. 596,394.

*To all whom it may concern:*

Be it known that I, CHARLES B. SCHOENMEHL, citizen of the United States, and resident of Waterbury, in the county of New Haven and State of Connecticut, have invented certain new and useful Improvements in Primary Batteries, of which the following is a specification.

The present invention refers to plate forms of primary batteries and is particularly directed to means for increasing the efficiency of batteries of this class.

With the above objects in view I have produced a plate form of battery wherein the two compressed oxid of copper negative electrodes are so arranged with reference to the positive electrodes, as to insure four working faces thereof instead of two as is usually the case with the present commercial types of this class of battery, and furthermore wherein an increased positive electrode surface is provided adjacent to the faces of the negative electrodes so as to co-act and insure a uniform, though increased amount of e. m. f. at a comparatively small additional cost. This form of battery is particularly desirable since in many instances two of them will do the work which formerly required three of the old type of cells and again in other instances one will do the work which two of the smaller type cells were required to do. In this connection it will also be noted that less jar room would be required thus again making the battery particularly desirable.

Figure 1:
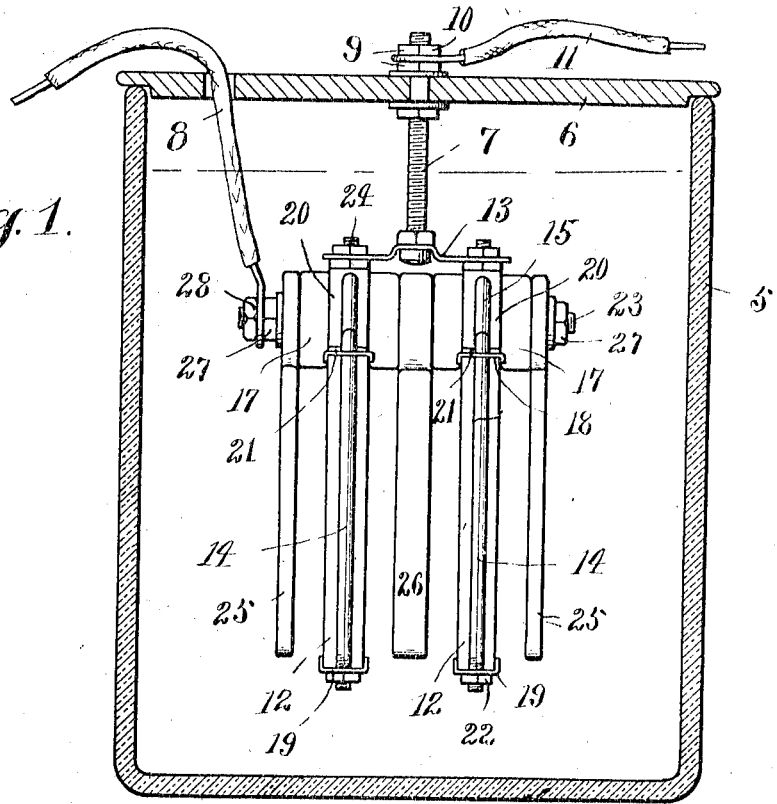
Figure 2:
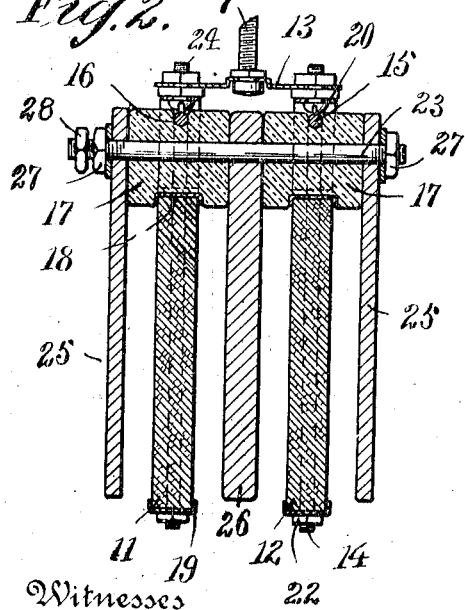
Figure 3:
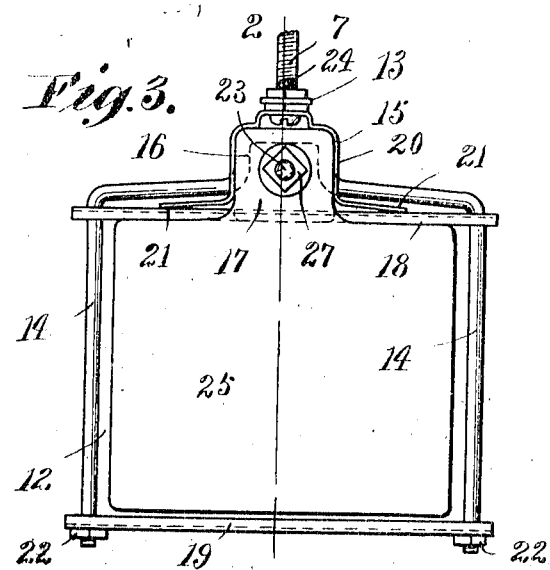

The invention may obviously be carried out by the use of different constructions of holding frames and suspending means, therefore I do not wish to be confined to the particular form of construction shown in the drawings and upon which similar characters of reference will be found to designate like or corresponding parts throughout the several figures and of which, Figure 1, shows a side edge view of my improved assembled battery elements, suspended within a suitable containing jar. Fig. 2, is a central vertical cross sectional view of the assembled battery element shown in Figs. 1 and 3, and taken on line 2—2 of Fig. 3, and Fig. 3, is a side view of the said assembled element as shown in the preceding drawings.

Referring in detail to the characters of reference marked upon the drawings 5 indicates a containing jar and 6 the cover therefor. The cover is provided with two holes the central one of which serves for the attachment of the suspending rod 7, while the outer one serves for the passage of the flexible wire 8 to be connected with the element. The suspending rod 7 is provided with washers and nuts 9 whereby it is securely fastened to the cover and is further provided with a nut 10 for the connection of a field wire 11 which through the said suspending rod is electrically connected with the negative electrodes 12 of which there are two in number. These plates are alike in construction and are formed of compressed copper of oxid of suitable size, shape and proportion. These plate electrodes are each contained within metal frames that are mechanically and electrically connected by means of a yoke 13, to the before mentioned suspending rod 7. The said frames as shown include a U shaped wire portion 14 having an upwardly disposed loop 15 that is seated in a groove 16 formed in the two sides and top portion of the insulating blocks 17. The vertically disposed wire sides of this frame are arranged against the side edges of the negative plate while an upper and lower channel frame 18 and 19 respectively serve to engage the top and bottom edges of the said negative plate. The insulating blocks are thus seated intermediate of the loop portion of the wire frame and the top cross piece 18 and are properly held by means of a sheet metal clip 20 that is stamped up to shape and provided with holes on opposite sides to receive the upper portions of the wire frame 14. The lower extremities 21 of this clip is disposed against the top surface of the cross piece 18 in a manner to tend to force the same down against the top edge of the plate when the nuts 22 on the lower end of the U shaped wire frame are turned up tight against the lower cross piece 19 thus insuring a rigid assemblement of the parts together. The intermediate upper portion of the clip is punched and otherwise pressed to form a pocket for the head of a short bolt 24 which is provided with suitable nuts and serves to connect the clip and the yoke together.

The insulating blocks for the two plates are located in the top portion of the frame and are provided with a cross hole for the reception of a bolt 23 which passes therethrough and likewise through the upper portions of the three positive zinc electrodes 25 and 26. The two former of these electrodes are arranged on the outside of the negative electrodes while the latter and heavier one designated as 26 is located between the negative electrodes and the insulating blocks. The nuts 27 serve to bind the plates and blocks together when arranged upon the bolt in the manner indicated, while the binding nut 28 serves for the attachment of the field wire 8 before mentioned which through the said nuts and bolt are electrically connected with the three positive electrodes though insulated from the co-acting electrodes, which as before stated have their connection through the suspending rod. The action of the battery therefore is directly between the adjacent faces of the opposing electrodes to the extent that the inner surfaces of the two outer positive plates co-act with the outer faces of the negative plates while the two outer faces of the thick inner positive plate similarly co-act with the inner faces of the two negative plates. The inner positive plate is made of substantially double the thickness of the outer positive plates, to provide an increased amount of material to suitably work out the adjacent sides of the two negative plates and thus insure all parts of the battery running out equally.

Having thus described my invention what I claim and desire to secure by Letters Patent is—

1. In a primary battery of the class described, the combination of an assembled element, comprising a pair of vertically arranged compressed oxid of copper negative electrodes, an insulating block attached to each of said electrodes, a vertically disposed positive plate arranged between the said blocks and the compressed oxid of copper negative electrodes, an additional vertically disposed positive electrode arranged on the opposite and outer side of each of the two said negative electrodes, means for mechanically and electrically connecting the positive electrodes, means for mechanically and electrically connecting the negative electrodes, and a single suspending means for suspending the assembled element within a battery jar.

2. In a primary battery of the class described, the combination of an assembled element, comprising a pair of vertically arranged compressed oxid of copper negative electrodes, an insulating block attached to each of said electrodes, a vertically disposed positive plate arranged between the said blocks and compressed oxid of copper negative electrodes, an additional vertically disposed positive electrode arranged on the opposite and outer side of each of the said negative electrodes, a bolt passing through the blocks and positive electrodes for connecting the same, a yoke for mechanically and electrically connecting the negative electrodes, and a single suspending rod for suspending the assembled element within a battery jar.

3. In a primary battery of the class described, the combination of an assembled element, comprising a pair of compressed oxid of copper negative electrodes, an insulating block attached to each of said electrodes, a positive electrode arranged between the said blocks and compressed oxid of copper negative electrodes, additional positive electrodes arranged on the opposite and outer sides of the two said negative electrodes, means for mechanically and electrically connecting the positive electrodes, means for mechanically and electrically connecting the negative electrodes, and a single suspending means for suspending the assembled element within a battery jar.

4. In a primary battery of the class described, the combination of an assembled element, comprising a negative electrode, a metal frame including in part two top cross pieces for engaging the edge thereof, an insulating block seated thereon, a metal clip attached to and covering the top portion of the block and the top member of the frame and having its yieldable end portions disposed against the under one of the top cross pieces to press the same against the edge of the negative electrode, positive plates insulatively connected to the said frame, and means for supporting the said assembled elements within a battery jar.

5. In a primary battery of the class described, an assembled element, comprising a series of five or more electrodes, there being an odd number of positive electrodes and an even number of negative copper oxid electrodes alternately and vertically arranged side by side, the intermediate ones of said positive plates being thicker than the outer plates, means for insulatively separating such positive from the negative electrodes, means for mechanically and electrically connecting the negative electrodes, means for mechanically and electrically connecting the positive electrodes, and a single suspending means for supporting such assembled elements within a battery jar.

6. In a primary battery of the class described, an assembled element composed of a plurality of positive electrodes and a plurality of compressed oxid of copper negative electrodes, said positive and negative electrodes being alternately and vertically arranged, insulating blocks separating the electrodes at their electrically connected ends, terminals for said electrodes, a bolt for connecting the said electrodes and blocks, and forming connecting means for the electrodes of one polarity, means for mechanically and electrically connecting the other electrodes, and means for supporting the elements.

7. In a primary battery of the class described, an assembled element comprising a series of five or more electrodes, the negative electrodes being of copper oxid and there being an odd number of electrodes of one polarity and an even number of electrodes of the other polarity alternately and vertically arranged side by side, the intermediate ones of said positive electrodes being thicker than the outer electrodes, means for insulatively separating the positive from the negative electrodes, means for mechanically and electrically connecting the negative electrodes, means for mechanically and electrically connecting the positive electrodes, and a single suspending means for supporting the assembled element within a battery jar.

Signed at Bridgeport, in the county of Fairfield and State of Connecticut, this 7th day of December, A. D. 1910.

CHARLES B. SCHOENMEHL.

Witnesses:
C. M. NEWMAN,
RUTH M. WORDEN.

---

Copies of this patent may be obtained for five cents each, by addressing the "Commissioner of Patents, Washington, D. C."